Figure 1:
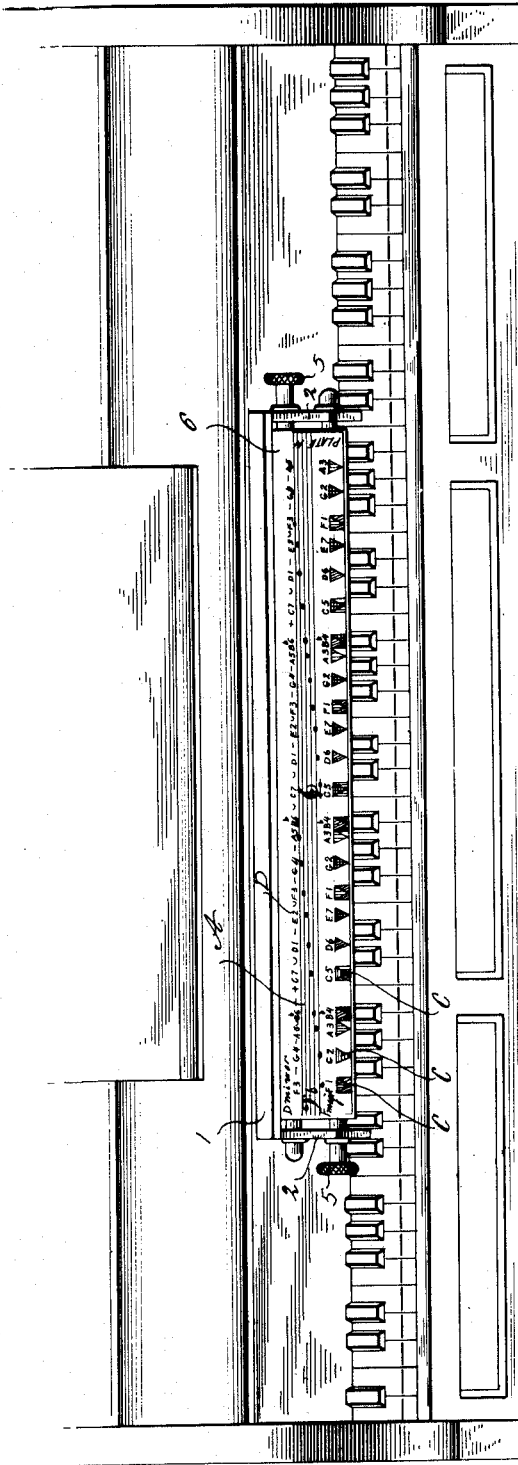

C. H. HARTMAN.
MUSIC INDICATOR.
APPLICATION FILED JULY 13, 1910.

1,045,021.

Patented Nov. 19, 1912.
2 SHEETS—SHEET 1.

Witnesses
E. Larson
L. E. Dodge

Inventor
C. H. Hartman
By Beeler & Cobb
Attorneys

C. H. HARTMAN.
MUSIC INDICATOR.
APPLICATION FILED JULY 13, 1910.
1,045,021.
Patented Nov. 19, 1912.
2 SHEETS—SHEET 2.
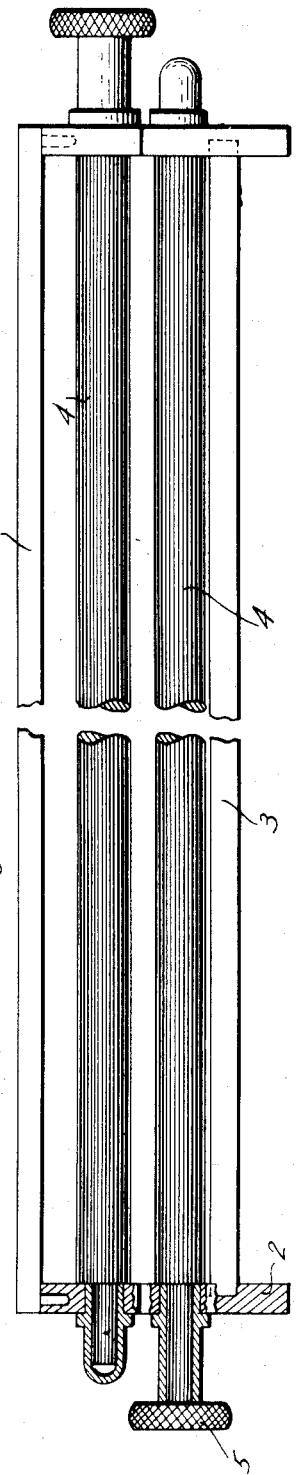
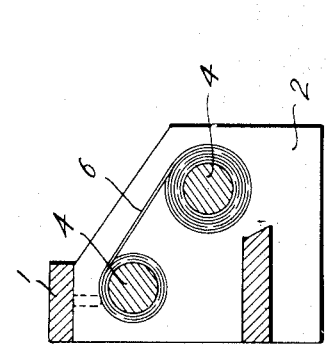
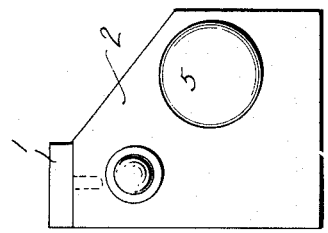
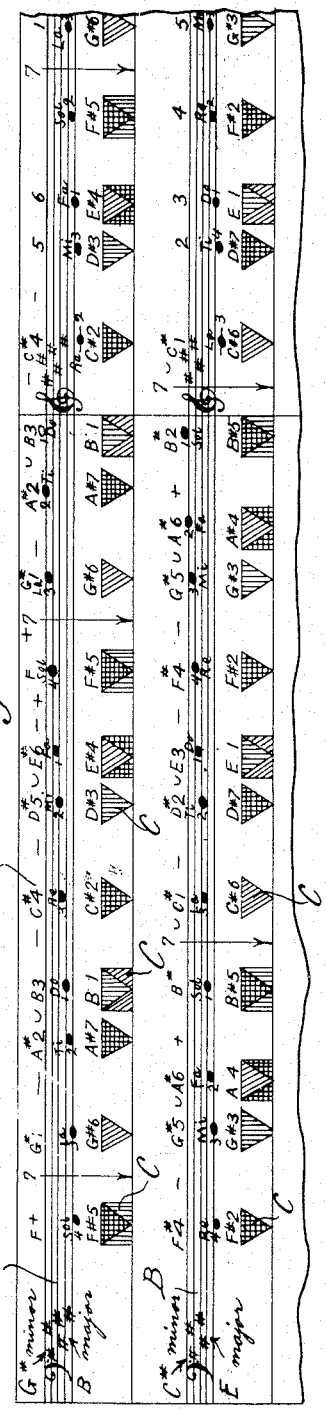
Witnesses
E. Larson
C. F. Calhoun
Inventor
C. H. Hartman
By Delbert H. Cobb
Attorneys

UNITED STATES PATENT OFFICE.

CHARLES H. HARTMAN, OF ATLANTA, GEORGIA.

MUSIC-INDICATOR.

1,045,021.  Specification of Letters Patent.  Patented Nov. 19, 1912.

Application filed July 13, 1910. Serial No. 571,761.

*To all whom it may concern:*

Be it known that I, CHARLES H. HARTMAN, a citizen of the United States, residing at Atlanta, in the county of Fulton and State of Georgia, have invented certain new and useful Improvements in Music-Indicators, of which the following is a specification.

This invention consists of a specially designed construction of indicator adapted to be associated with the key board of a musical instrument, and embodying characters, devices, names and other indicia arranged in relation to notes of the musical staff, whereby to show the relation between a musical staff and the keys of the key board.

The invention is also designed to indicate several musical scales successively in the order of their transposition, the proper piano keys to be used for playing each scale, and the relation of each relative minor scale to its major scale.

The indicia forming a part of the invention includes a desirable arrangement of numbers associated with the notes whereby to facilitate correct fingering of each scale, and in addition a peculiar arrangement of differently colored signs or devices is employed in association with the notes of the scale to show the formation of the principal chords of each scale and their relations one to another, said signs being adapted when the device is applied to an instrument, to point directly to the proper keys to be touched in making the desired chords.

The essential object of the invention is to provide an indicator of the above class, the use of which assists in materially simplifying the elementary study of music, making it possible to master such study with less labor, time and at less expense than incidental to the ordinary method.

The invention is also adapted to be used in public schools and singing classes for the teaching of sight singing and transposition, it only being necessary under such conditions to modify the size of the chart or other support provided with the various musical scales. The principle of the invention would be unaltered whether it is used for individual study or teaching or demonstration in classes.

For a full understanding of the invention, reference is to be had to the following detail description and the accompanying drawings, in which—

Figure 1 is a view of a piano showing the invention applied thereto; Fig. 2 is a front elevation of the frame of the supporting device and associated mechanical parts for turning the flexible sheet or chart having the musical scales; Fig. 3 is an end elevation of the device; Fig. 4 is a transverse section; Fig. 5 is a fragmentary view of the flexible sheet or chart having the indicia for facilitating the study of music printed thereon.

Throughout the following detail description and on the several figures of the drawings, similar parts are referred to by like reference characters.

Referring to the drawings, the invention may be very briefly described as consisting of a suitable support or frame comprising the top 1, the ends 2 and the bottom 3. The top 1 is removable to permit the invention to be applied to organs or other instruments provided with stops arranged unusually low. Mounted in suitable bearings in the ends 2 of the frame aforesaid are shafts 4 supported to turn readily by means of thumb pieces 5, one of which is provided with each shaft, the members 5 being located at opposite ends of the frame. The shafts 4 carry a flexible chart made of paper, fabric or any suitable material, and which is adapted to be wound and unwound with respect to the shafts by proper manipulation of the members 5. The indicia comprising the essential feature of this invention is carried by the flexible chart designated 6. However it may be observed that the frame above referred to is peculiarly constructed so that the ends 2 of said frame project beneath the bottom 3 permitting the lower extremities of said ends 2 to be received between certain of the black keys of the piano or equivalent musical instrument whereby to position the device and especially the indicia carried by the chart 6 with respect to the keys of said instrument.

Specifically describing the matter contained upon the chart 6, it may be observed that suitably inscribed thereon by means of printing or any other similar way are musical staffs A and B embodying the usual arrangement of notes of scales in certain keys. It is contemplated that the flexible chart 6 shall be sufficiently large to contain on its face all of the scales of the major and minor modes. Two of these scales illustrated in the base and treble clefs as customary are shown in Fig. 5 and just below the lines of each scale are located a plurality of signs shown at C comprising triangularly shaped blocks of different colors, such colors being illustrated on the drawings by distinguishing lines. Said signs C are arranged in direct association with the notes of the scales A and B and point downwardly to certain keys of the piano or instrument, when the indicating device comprising the invention is arranged in its proper operating position on the key board of such instrument. Certain of the signs C are of the same color as will be readily observed by reference to Fig. 5 of the drawings. All those signs of a similar color indicate notes of a certain chord and also by reason of their position they indicate the keys of the key board which make certain chords. The object of the arrangement is of course to facilitate learning of the chords not only with reference to the position of the keys of the key board but with reference to the relation to the notes of the scales. Thus each color for the signs C represent a distinctive chord, as for instance, the intervals 1, 3, 5, of the diatonic scale being red would indicate the common triad of the tonic.

The notes of the scales are likewise supplied with the names commonly used by certain masters to indicate the relative pitches, such as "do" "re", "mi", etc. These names are preferably printed above the notes of the scales.

The fingering of each major scale is indicated by the provision of numerals associated with the various notes of the scales by being placed either to the left or to the right of the same or on both sides where fingers of either hand may be employed to play such notes. It will be noted that the numerals indicating the fingering of the notes of the base clef are all arranged upon the left side of each respective note while carrying out the same principle, the numerals similarly associated with the notes of the treble clef are all arranged on the right side of each note thereof. The major mode is shown by the lower numerals, 1, 2, 3, 4, 5, 6 and 7 placed just above the colored triangles of the signs C, and similar numerals arranged above the lines of the scales A and B, as shown at D, indicate the minor mode in its harmonic form.

The name of each note of each scale is denoted at a point between each respective note and its associated sign C, the name of a musical note being well known to be a letter of the alphabet.

The characters shown at D in connection with the indicia on the staffs associated with the signs at C show the tones and degrees of the minor diatonic scale, relative to the major scale.

The various features of the printed matter exhibited on the flexible chart as above described will be understood as having a peculiar relation to the study or knowledge of music and which will be readily understood by a musician without further elucidation. When the indicator comprising the mechanical means above described is once placed in position upon the piano or instrument, its position remains unchanged with respect to the key board notwithstanding the adjustment of the flexible chart 6 by the thumb pieces 5 in bringing certain scales into view. This is essentially advantageous in that once the device is positioned in respect to the key board of the instrument, the student or user of the invention can not be confused when the flexible chart 6 is adjusted and in view of the fact that the indicia upon the chart will always assume a proper position with respect to the keys of the key board when the chart 6 is adjusted as may be desired to bring any certain one of the scales to view.

It will be observed that the key names, showing the minor mode are placed above each staff and those indicating the major mode are arranged below the staff with the signature (sharps or flats at the beginning of the staff) located between the two names. Thus, for instance, if under the staff, the words "G Major" appear, while above the staff are the words "E minor", this shows the reader that the signature one sharp is the signature of G Major and also of E minor. The above is especially advantageous in that the signature of a major and its relative minor mode and the transposition of the scales may be observed at a glance.

Having thus described the invention, what is claimed as new is:

1. In a music indicator comprising indicia illustrative of a musical staff with a key signature and scale of notes thereon, and the names and degrees of the notes in the minor mode of such key being arranged above the staff and the names and degrees of the notes in the major mode being arranged beneath the staff whereby the relation of the major and minor modes is shown in direct association with the notes of the staff, establishing the transposition of the scales to the eye.

2. A music indicator comprising indicia illustrative of a musical staff with a key signature and scale of notes, a sign associated with each note for indicating the musical chords, certain of the signs being of one color to represent notes of one chord and other signs being of a different color to indicate the notes of another chord, the names and degrees of the notes in the minor mode of such key being arranged above the staff and names and degrees of the notes in the major mode being arranged beneath the staff opposite those in the minor mode, and just above the signs aforesaid.

In testimony whereof I affix my signature in presence of two witnesses.

CHARLES H. HARTMAN.

Witnesses:
Mrs. R. L. CHISHOLM,
G. M. MURPHY.